United States Patent
Ao et al.

(10) Patent No.: US 9,749,186 B2
(45) Date of Patent: Aug. 29, 2017

(54) METHOD AND SYSTEM FOR INFORMATION INTERACTION AMONG SYSTEMS IN THE SAME END IN DRNI

(71) Applicant: ZTE CORPORATION, Shenzhen, Guangdong Province (CN)

(72) Inventors: Ting Ao, Shenzhen (CN); Jinghai Yu, Shenzhen (CN); Yuehua Wei, Shenzhen (CN); Xueqiong Xu, Shenzhen (CN); Zhui Guo, Shenzhen (CN)

(73) Assignee: ZTE Corporation (CN)

( * ) Notice: Subject to any disclaimer, the term of this patent is extended or adjusted under 35 U.S.C. 154(b) by 16 days.

(21) Appl. No.: 14/787,596

(22) PCT Filed: Apr. 16, 2014

(86) PCT No.: PCT/CN2014/075462
§ 371 (c)(1),
(2) Date: Oct. 28, 2015

(87) PCT Pub. No.: WO2014/176975
PCT Pub. Date: Nov. 6, 2014

(65) Prior Publication Data
US 2016/0105324 A1    Apr. 14, 2016

(30) Foreign Application Priority Data

Apr. 28, 2013 (CN) .......................... 2013 1 0155668

(51) Int. Cl.
*H04L 12/24* (2006.01)
*H04L 29/06* (2006.01)
(Continued)

(52) U.S. Cl.
CPC ............ *H04L 41/12* (2013.01); *H04L 45/245* (2013.01); *H04L 45/28* (2013.01); *H04L 47/41* (2013.01); *H04L 69/14* (2013.01); *Y02B 60/33* (2013.01)

(58) Field of Classification Search
None
See application file for complete search history.

(56) References Cited

U.S. PATENT DOCUMENTS 6,910,149 B2 * 6/2005 Perloff ...................... H04L 1/22
370/216
2010/0293408 A1 * 11/2010 Shannon ................. H04L 41/08
714/4.1
(Continued)

FOREIGN PATENT DOCUMENTS

CN    102014019 A    4/2011
CN    102316039 A    1/2012
(Continued)

OTHER PUBLICATIONS

Interworking Task Group of IEEE 802.1: "Draft Standard for Local and Metropolitan Area Networks—Link Aggregation; 802-1AX-REV-" Feb. 1, 2013, IEEE P802.1AX-REV™ ID1.0.
(Continued)

*Primary Examiner* — Andrew Oh
(74) *Attorney, Agent, or Firm* — Plumsea Law Group, LLC

(57) ABSTRACT

Disclosed are a method and system for information interaction between systems in a same portal in a distributed resilient network interconnection, wherein the method is applied to each system in an portal in a link aggregation group, including: sending a distributed relay control protocol (DRCP) message through an intra-portal interface, wherein at least system information of a present system is carried; after receiving a DRCP message sent by an adjacent
(Continued)

system, if it is determined that the present system and the adjacent system can form one portal in the distributed resilient network interconnection, determining an operational Key value of the present system. The system includes: a sending state machine, a receiving state machine, a negotiating state machine, a synchronizing state machine and a periodic sending state machine.

19 Claims, 8 Drawing Sheets

(51) Int. Cl.
*H04L 12/709* (2013.01)
*H04L 12/891* (2013.01)
*H04L 12/703* (2013.01)

(56) References Cited

U.S. PATENT DOCUMENTS

2012/0182866 A1* 7/2012 Vinayagam ........... H04L 45/245
370/228
2014/0115189 A1* 4/2014 Ao ........................ H04L 45/245
709/250
2015/0172121 A1* 6/2015 Farkas ................. H04L 45/245
370/218

FOREIGN PATENT DOCUMENTS

CN 102752187 A 10/2012
JP 2016523021 A 8/2016

OTHER PUBLICATIONS

Interworking Task Group of IEEE 802.1: "Draft Standard for Local and Metropolitan Area Networks—Link Aggregation; 302-1AX-REV-" Apr. 24, 2013, IEEEP802.1AX-REV™ ID2.0.
European Search Report Issued Mar. 9, 2016 in European Patent Application No. EP14791616.7.
The International search report dated Jul. 23, 2014 in International application No. PCT/CN2014/075462.
Written Opinion of The International Search Authority mailed Jul. 23, 2014 for PCT Application No. PCT/CN2014/075462.
Japanese Office Action dated Sep. 13, 2016 in Japanese Patent Application No. 2016-510922.

* cited by examiner

METHOD AND SYSTEM FOR INFORMATION INTERACTION AMONG SYSTEMS IN THE SAME END IN DRNI

CROSS-REFERENCE TO RELATED APPLICATION(S)

This application is the U.S. National Phase application of PCT application number PCT/CN2014/075462 having a PCT filing date of Apr. 16, 2014, which claims priority of Chinese patent application 201310155668.9 filed on Apr. 28, 2013, the disclosures of which are hereby incorporated by reference.

TECHNICAL FIELD

The present document relates to the network communication protection technology, and more particularly, to a method and system for information interaction among systems in a same portal in a DRNI (Distributed Resilient Network Interconnected).

BACKGROUND OF THE RELATED ART

With the rapid development of broadband services, network-to-network interconnection is used more and more to carry more services. According to the technology used, there may be a variety of ways within the network to protect links and nodes thereon. With increasingly strong demands for traffic protection and increasingly high requirements, operators proposed the demands for protection on the network interconnection. Herein the protection can be achieved by using port aggregation, and the commonly used method can be port aggregation or ring protection. In the existing IEEE (Institute of Electrical and Electronics Engineers) standard 802.1AX, the link aggregation currently supports the port aggregation on one node and therefore can only be used for link protection but cannot protect nodes at the network edge interface.

Therefore, in order to apply to the diversity of network-to-network interconnected area networking ways, and to achieve not only the protection for links but also the protection for edge nodes, the IEEE Standards Association proposed extended link aggregation, which achieves the link and node dual redundant network interconnected protection demands by means of a distribution link aggregation group DRNI, namely, an portal of the aggregation group consists of a plurality of nodes, and the aggregation links of the plurality of nodes form a link aggregation group (referred to as LAG). As shown in FIG. 1, two portals A and B in the link aggregation group consist of two and three systems, respectively: the portal A comprises system 1 and system 2, and the portal B comprises system 3, system 4, and system 5, a plurality of links of these five systems are aggregated together to form a distributed LAG. Through this distributed LAG, dual protection of links and nodes can be achieved.

The system 1 and the system 2 in the Portal A need to be connected through an intra-portal link, thus ensuring that the portal B sees that the portal A to which it is connected via a link aggregation group is a logical node; similarly, the system 3, the system 4 and the system 5 in the portal B also need to be connected through intra-portal links, thus ensuring that the portal A sees that the portal B to which it is connected via a link aggregation group is a logical node. After a plurality of links interconnected between the logical nodes in the portal A and the logic nodes in the portal B form a distributed link aggregation group through the LACP (Link Aggregation Control Protocol) control message interaction.

The DRNI interconnects two or more systems through a distributed relay (referred to as DR), wherein each system operates the link aggregation, thereby forming one Portal. For the peer system connected to the Portal, the peer system considers what it is connected to is an analog system. For this purpose, various systems within a Portal need to interact and negotiate through a distributed relay to unify parameters between these systems and notify to the LACP to interact with the other portal of the link aggregation group.

There are three kinds of interfaces on the DR, and they are Gateway Interface, Intra-portal Interface and Aggregate Interface, respectively. The DR functions to send messages (UP messages) received from the aggregation interface to the gateway or to discard them, and to send messages (DOWN messages) received from the gateway interface to the aggregator or to discard them. The DR decides whether to forward or discard a message according to the conversation to which the received message belongs, and configurations of the gateway algorithm and the port algorithm are also operated based on the conversation. Traffic of each conversation is assigned with one gateway link at most, and the traffic of each conversation also corresponds to one aggregation interface at most. When the DR in multiple systems within one portal do not have the consistent message distribution way, it will cause problems such as messages out of order, forming a ring or message loss, and therefore when there is the case that the distribution ways are inconsistent between multiple systems, it is also needed to interact via the distributed relay to unify the distribution ways in different systems or isolate the service traffic the distribution ways of which are not uniform.

SUMMARY

The object of the present document is to provide a method and system for information interaction between systems in a same portal within a DRNI in order to achieve link aggregation of a plurality of systems.

To solve the foregoing problem, the present document provides a method for information interaction between systems in a same portal in a distributed resilient network interconnection, used in each system in a portal of a link aggregation group, comprising:

sending a distributed relay control protocol (DRCP) message via an intra-portal interface, wherein at least system information of a present system is carried;

after receiving a DRCP message sent by an adjacent system, if it is judged that the present system and the adjacent system can form an portal of the distributed resilient network interconnection, determining an operational Key value of the present system.

Preferably, the method further comprises:

after determining the operational Key value of the present system, setting up a distributed relay channel within the present system.

Preferably, the method further comprises: after determining the operational Key value of the present system, negotiating a unified conversation distribution way with the adjacent system.

Preferably, said judging that the present system and the adjacent system can form the same portal comprises:

performing a matching check on the system information of the adjacent system carried in the received DRCP message and the system information of the present system, if the matching check is passed, determining that the present system and the adjacent system can form the same portal.

Preferably, said performing a matching check on the system information of the adjacent system carried in the received DRCP message and the system information of the present system comprises:

judging whether a Portal ID of the present system and a Portal ID of the adjacent system are consistent; and/or judging whether an Emulated System ID of the present system and a Emulated System ID of the adjacent system are consistent;

the matching check being passed comprises: the Portal ID of the present system and the Portal ID of the adjacent system being the same, and/or the Emulated System ID of the present system and the Emulated System ID of the adjacent system being the same.

Preferably, said performing a matching check on the system information of the adjacent system carried in the received DRCP message and the system information of the present system further comprises:

judging whether a System Number of the present system conflicts with a System Number of the adjacent system;

the matching check being passed comprises: the Portal ID and/or Emulated System ID of the present system and the Portal ID and/or Emulated System ID of the adjacent system being the same respectively, and the System Number of the present system not conflicting with the System Number of the adjacent system.

Preferably, the method further comprises: if the matching check is passed, saving the system information of the adjacent system carried in the DRCP message.

Preferably, said sending a DRCP message comprises: periodically sending the DRCP message;

the method further comprises:

after receiving the DRCP message sent by the adjacent system each time, starting a timer;

if the DRCP message sent by the adjacent system is not received when the timer expires, or if the DRCP message sent by the adjacent system is received before the timer expires but the matching check is not passed, determining that the present system and the adjacent system no longer can form a portal of the distributed resilient network interconnection.

Preferably, said sending a DRCP message comprises:

when there is a parameter updated in the system information of the present system, sending the DRCP message.

Preferably, said determining an operational Key value of the present system comprises:

if it is judged that the operational Key value of the present system and the operational Key value of the adjacent system are the same, remaining the operational Key value of the present system unchanged.

Preferably, said determining an operational Key value of the present system comprises:

if it is judged that the operational Key value of the present system and the operational Key value of the adjacent system are different, based on a policy, modifying the operational Key value of the present system or remaining the operational Key value of the present system unchanged.

Preferably, said determining an operational Key value of the present system comprises:

calculating the operational Key value of the present system in accordance with an administration Key value of the present system and a received administration Key value of the adjacent system.

Preferably, the method further comprises:

after determining the operational Key value of the present system, sending the operational Key value of the present system to a peer portal of the distributed resilient network interconnection through a Link Aggregation Control Protocol (LACP) message.

Preferably, said negotiating a unified conversation distribution way with the adjacent system comprises:

negotiating the conversation distribution way carried in the DRCP message sent by the adjacent system and the conversation distribution way of the present system, and configuring a traffic distribution way of a distributed relay within the present system in accordance with the negotiated conversation distribution way;

the conversation distribution way comprises any one or combination of the following two parameters: a gateway system selection and an aggregator/aggregation port selection.

Preferably, said negotiating the conversation distribution way carried in the DRCP message sent by the adjacent system and the conversation distribution way of the present system comprises: comparing the conversation distribution way carried in the DRCP message sent by the adjacent system with the conversation distribution way of the present system, and for conversations that are consistent in the conversation distribution way, the distributed relay distributing traffic of the conversations according to the consistent conversation distribution way, for conversations that have conflicts in the conversation distribution way, the distributed relay filtering or discarding traffic of the conversations that have conflicts in the conversation distribution way.

Preferably, said setting up a distributed relay channel within the present system comprises:

configuring the conversation distribution of the distributed relay on a gateway and an aggregator/aggregation port, and after the configuration, the distributed relay forwarding conversation traffic between the gateway and the aggregator/aggregation port in the present system.

Preferably, before negotiating the unified conversation distribution way with the adjacent system, the method further comprises:

disabling a data traffic forwarding function of an intra-portal link with the adjacent system;

after negotiating the unified conversation distribution way with the adjacent system and unifying a distribution algorithm, enabling the data traffic forwarding function of the intra-portal link.

Preferably, the method further comprises:

if it is determined that the present system and the adjacent system no longer can form a portal of the distributed resilient network interconnection, determining whether it is needed to modify the system information of the present system based on the policy; if it is needed to modify, modifying at least part of LACP parameters in the system information of the present system, and sending the modified LACP parameter(s) to the peer portal of the distributed resilient network interconnection through an LACP message; wherein the modified LACP parameter(s) of the present system is/are at least not identical with the LACP parameters of the adjacent system.

Preferably, said modifying at least part of LACP parameters in the system information of the present system comprises: modifying the operational key value and/or the System ID of the present system, or restoring the operational Key value to the administration Key value.

Preferably, when the intra-portal link with the adjacent system fails or the intra-portal link is unavailable, the distributed relay is restored to the configuration of the conversation distribution way before the negotiation.

Preferably, the DRCP message sent via the intra-portal interface also carries the system information and/or conversation distribution ways of other adjacent systems connected with the present system.

Correspondingly, the present document also provides a system for implementing distributed relay control in a distributed resilient network interconnection, comprising:

a sending state machine, configured to: when other state machines in the present system instruct Need to transmit or Need to transmit periodically, send a distributed relay control protocol (DRCP) message;

a receiving state machine, configured to: receive a DRCP message sent by an adjacent system, perform a matching check on system information of the present system and the adjacent system, record the information in the DRCP message after the matching check is passed, and start a timer to judge whether the DRCP message sent by the adjacent system again is received on time;

a negotiating state machine, configured to: determine an operational Key value of the present system, and ensure that the operational Key value is consistent with an operational Key value of the adjacent system;

a synchronizing state machine, configured to: establish a forwarding channel between an aggregator/aggregation port and a gateway, negotiate a unified conversation distribution way with the adjacent system as required, and configure the conversation distribution way of a distributed relay;

a periodic sending state machine, configured to: decide to periodically send the DRCP message by the sending state machine.

Preferably, the receiving state machine being configured to perform the matching check on the system information of the present system and the adjacent system, comprises:

the receiving state machine judging whether a Portal ID of the present system and a Portal ID of the adjacent system are consistent; and/or judging whether an Emulated System ID of the present system and an Emulated System ID of the adjacent system are consistent;

the matching check being passed comprises:

the Portal ID of the present system and the Portal ID of the adjacent system being the same, and/or the Emulated System ID of the present system and the Emulated System ID of the adjacent system being the same.

Preferably, the receiving state machine being configured to perform the matching check on the system information of the present system and the adjacent system, further comprises:

the receiving state machine judging whether a System Number of the present system conflicts with a System Number of the adjacent system;

the matching check being passed comprises: the Portal ID and/or the Emulated System ID of the present system and the Portal ID and/or the Emulated System ID of the adjacent system being the same respectively, and the System Number of the adjacent system being legal, or, the System Number of the present system not conflicting with the System Number of the adjacent system.

Preferably, the negotiating state machine being configured to determine the operational Key value of the present system, and ensure that the operational Key value is consistent with the operational Key value of the adjacent system, comprises:

when judging that the operational Key value of the present system and the operational Key value of the adjacent system are the same, the negotiating state machine remaining the operational Key value of the present system unchanged; when judging that the operational Key value of the present system and the operational Key value of the adjacent system are different, based on a policy, the negotiating state machine modifying the operational Key value of the present system or remaining the operational Key value of the present system unchanged.

Preferably, the negotiating state machine being configured to determine the operational Key value of the present system, and ensure that the operational Key value is consistent with the operational Key value of the adjacent system, comprises: according to an administration Key value of the present system and a received administration Key value of the adjacent system, the negotiating state machine calculating the operational Key value of the present system.

Preferably, the negotiating state machine is further configured to: after determining the operational Key value of the present system, send the operational Key value of the present system to a peer portal of the distributed resilient network interconnection through a Link Aggregation Control Protocol (LACP) message.

Preferably, the synchronizing state machine being configured to negotiate the unified conversation distribution way with the adjacent system, comprises: negotiating the conversation distribution way carried in the DRCP message sent by the adjacent system and the conversation distribution way of the present system, and configuring a traffic distribution way of the distributed relay in the present system in accordance with the negotiated conversation distribution way.

Preferably, the synchronizing state machine being configured to negotiate the conversation distribution way carried in the DRCP message sent by the adjacent system and the conversation distribution way of the present system, comprises:

the synchronizing state machine comparing the conversation distribution way carried in the DRCP message sent by the adjacent system with the conversation distribution way of the present system, and for conversations that are consistent in the conversation distribution way, distributing traffic of the conversations according to the consistent conversation distribution way, for conversations that have conflicts in the conversation distribution way, filtering or discarding traffic of the conversations that have conflicts in the conversation distribution way.

Preferably, the conversation distribution way comprises any one or combination of the following two parameters: a gateway system selection and an aggregator/aggregation port selection.

Preferably, the synchronizing state machine is further configured to: before negotiating the unified conversation distribution way with the adjacent system, disable a data traffic forwarding function of an intra-portal link with the adjacent system; after negotiating the unified conversation distribution way with the adjacent system and unifying a distribution algorithm, enable the data traffic forwarding function of the intra-portal link.

Preferably, the receiving state machine is further configured to: if the DRCP message sent by the adjacent system again is not received on time or the received DRCP message sent by the adjacent system again does not pass the matching check, judge whether it is needed to modify the system information of the present system based on the policy; if it is needed to modify, modify at least part of LACP parameters in the system information of the present system, and send the modified LACP parameter(s) to the peer portal of the distributed resilient network interconnection through the LACP message; wherein the modified LACP parameter(s) of the present system is/are at least not identical with the LACP parameters of the adjacent system.

Preferably, the receiving state machine being configured to: modify the at least part of the LACP parameters in the system information of the present system, comprises: the receiving state machine modifying the operational Key value and/or the System ID of the present system, or restoring the operational Key value to the administration Key value.

Preferably, the synchronizing state machine is further configured to: when the intra-portal link with the adjacent system fails or the intra-portal link is unavailable, restore the distributed relay to the configuration of the conversation distribution way before the negotiation.

Preferably, the DRCP message sent by the sending state machine via the intra-portal interface also carries system information and/or conversation distribution way of other adjacent systems connected with the present system.

After the embodiments of the present document are used, it is to achieve the control communication between multiple systems in one portal in the distributed link aggregation group, can effectively achieve protection on the interconnected interface, not only protection on the link but also protection on the level of node, after multiple systems aggregate into one aggregation group.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

PREFERRED EMBODIMENTS OF THE INVENTION

Hereinafter, in conjunction with the accompanying figures, the embodiments of the present document will be described in detail. It should be noted that, in the case of no conflict, embodiments in the present application and features in the embodiments may be arbitrarily combined with each other.

In the following, in order to better describe the control process and the operating condition of the distributed relay control protocol, it will be described from the perspective of the control protocol state machine.

Figure 2:
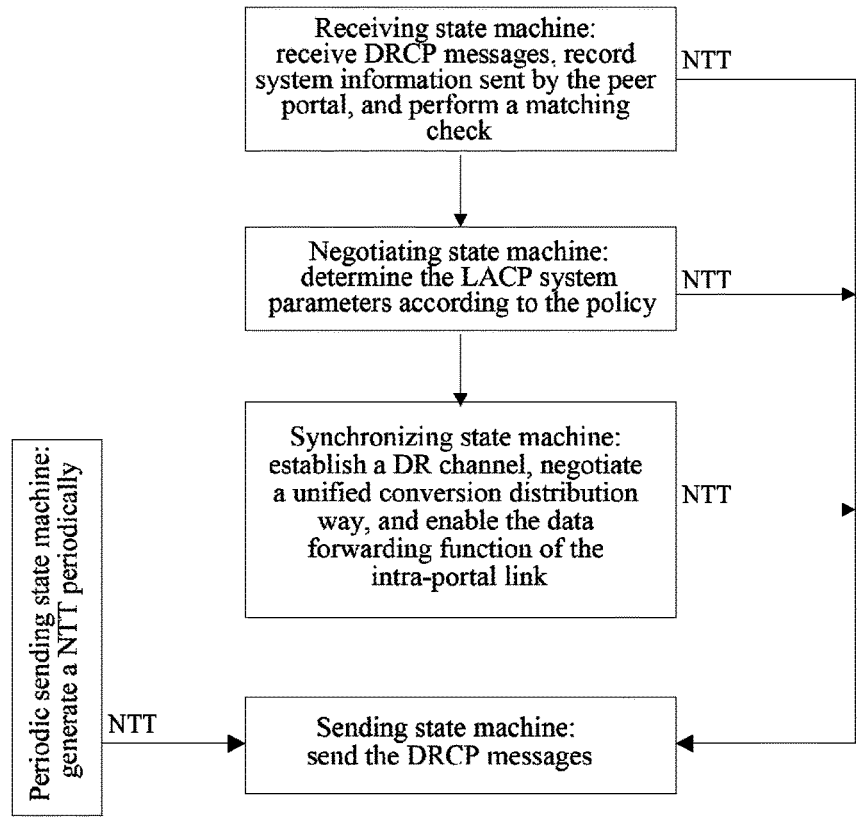
FIG. 2 is a schematic diagram of a flow of a distributed relay control protocol state event in accordance with an embodiment of the present document.

As shown in FIG. 2, the Distributed Relay Control Protocol (referred to as DRCP) within the system mainly comprises: a receiving state machine, a synchronizing state machine and a sending state machine, and may further comprise: a negotiating state machine and a periodic sending state machine.

The receiving state machine is mainly used for receiving the DRCP message sent by an adjacent system. The received DRCP message comprises system information (Actor_Info) of the adjacent system which sends the message, and may also comprise system information (Partner_Info) of other systems connected with the adjacent system stored by the adjacent system which sends the message. The main tasks of the receiving state machine are:

a) receiving the DRCP message sent by an adjacent system;

b) whenever receiving the DRCP message sent by an adjacent system, starting the timer once, if the DRCP message sent by the adjacent system is still not received when the timer expires, considering losing contact with the adjacent system, and entering the Uncontact state;

c) if determining that the present system and the adjacent system can form one portal in the distributed resilient network interconnection, saving the Actor_Info carried in the received DRCP message, if the DRCP message carries the Partner_Info, also saving it. Wherein the following steps are used to judge whether the present system and the adjacent system can form one portal in the distributed resilient network interconnection, comprising:

Step 1: first it is to compare whether the Portal ID carried in the received DRCP message and the Portal ID of the portal to which the present system belongs are consistent, and if they are consistent, it is indicated that both parties really belong to the same portal, and it is to proceed to step 2; if they are not consistent, it is to discard the DRCP message;

Step 2: it is to compare whether the Emulated System ID carried in the DRCP message is consistent with the Emulated System ID value of the present system; if they are consistent, it is to proceed to step 3; if they are not consistent, it is to discard the DRCP message; wherein, when each system sends the LACP message, the value of the System ID field carried in the message is the value of the Emulated System ID of the present system;

in some cases, values of the Portal ID and the Emulated System ID in the system are consistent. Thus, the above-mentioned process can only compare whether the Portal IDs or the Emulated System IDs of two systems are consistent.

Step 3: it is to check whether the System Number of the system sending the DRCP message carried in the DRCP message conflicts with the System Number of the present system, i.e. it is to judge whether they are the same. If they are not the same, it is indicated that the two systems already meet the condition for aggregating into one DRNI interface, i.e. the two systems can form one logical system, namely, Portal.

When it is determined that the System Number of the system which sends the DRCP message does not conflict with the System Number of the present system (i.e., they are not the same), it is indicated that a matching check is passed, the intra-portal link protocol states of the present system and the adjacent system sending the DRCP message are set as being aggregated, that is, DRCP.State=Contact is set. In a concrete implementation, in order to avoid exceptions, it can further judge whether the System Number of the system which sends the DRCP message is legal, i.e. whether the value of the System Number is within a reasonable value range, when it is determined that the System Number of the System which sends the DRCP message is legal and does not conflict with the System Number of the present system, it is indicated that the matching check is passed.

d) If the DRCP message sent by another system which is already aggregated with the present system is not received before the timer expires or the DRCP message received before the timer expires does not pass the matching check in step c) (i.e., equivalent to that a qualified DRCP message sent by the another system is not received), it is indicated that the present system lost contact with the another system, and at this time the two systems can no longer aggregate, and it is needed to take relevant actions to carry out de-aggregation to separate these two systems.

The negotiating state machine is used to determine the Operational Key of the present system, ensuring that the Operational Key value unified with the adjacent system which sends the DRCP message is obtained, and the Operational Key is a parameter carried in the LACP message. After the negotiation, DRCP.State=Synchronization is set.

The synchronizing state machine is mainly used to set up a DR channel, forward data at the DRNI interface and distribute the traffic between the systems, mainly comprising:

a) It is to set up the DR channel. After the DR channel is set up, forwarding channels of the DRNI interface and other ports of the present system have been set up, that is, data traffic can be sent, received, or forwarded to other interfaces via the DRNI interface. At this time, the DR channel only forwards data via the DRNI interface and other ports of the present system but does not distribute the data to an adjacent system.

b) If the DR channel is used for the transit of data but also needs to have the data distribution function, that is, the systems in both parties need to negotiate a unified conversation distribution way, to determine to forward a message of a particular conversation from the links on which DRNI interfaces of the present system. Herein, the realization of the data distribution process may need the intra-portal link to involve in forwarding the data, and at this time, the synchronizing state machine is needed to negotiate the conversation distribution way between the two systems. When the two parties can negotiate to achieve an agreement, it is indicated that the two parties unified that the particular conversation traffic should go through which system, and at this time, DRCP.State=Forward is set.

c) When the DR channel can distribute the traffic in different systems, the data traffic may need to be transmitted on the intra-portal link, and at this time, the intra-portal link transmitting data traffic function of the upper portal of the intra-portal link should be enabled, so that the data traffic can be forwarded through the intra-portal link in the systems in the same Portal. Further, the in and out of the traffic in the upper portal of the intra-portal link is configured, so as to ensure that different conversation traffic can go through a particular system and a particular aggregation port. Since then, the DR channels on the various systems can distribute the traffic based on the negotiated conversation distribution way.

When DRCP.state=Synchronization, the synchronizing state machine is triggered to process, when DRCP.State=Contact, the negotiating state machine is triggered to process. When the physical link of the original intra-portal link fails or is used for other purposes, it no longer can be used by the DRNI as intra-portal link, the IPL (Intra-Portal Link).State=Down is set, and at this time data messages cannot be forwarded by the intra-portal link, if the system is in the synchronization state at this time, i.e. DRCP.State=Synchronization, it is needed to disable the data forwarding function of the IPL and to restore to the conversation distribution way of the DR channel before the negotiation, that is, the data messages received by the present system are also forwarded out from the present system rather than are distributed through the intra-portal link.

The sending state machine is used to send the DRCP message through the intra-portal interface, herein sending the DRCP message can be triggered through commands sent from other state machines or can also be triggered by a periodic sending state machine. When at least part of parameters in the Actor_Info in the system changes, it is needed to re-negotiate and it may also trigger to send the DRCP message.

The periodic sending state machine is used to decide when the present system sends the DRCP message so as to transfer relevant information and maintain connectivity with other systems. Generally, the interior of the periodic sending state machine has a timer, and when the timer expires, a NTT (Need to transmit) will be produced, to trigger the sending state machine to send the DRCP message.

Figure 3:
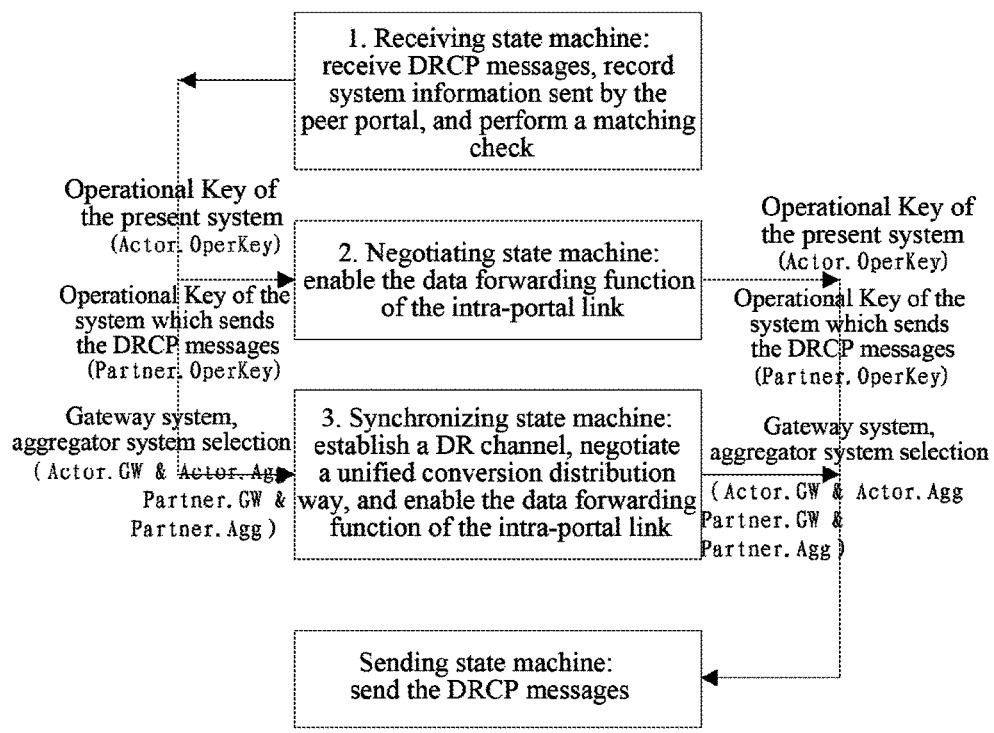
FIG. 3 is a schematic diagram of distributed relay control protocol parameter transfer in accordance with an embodiment of the present document.

The distributed relay control protocol needs to transfer some information in these state machines during the state switching process. As shown in FIG. 3, it comprises:

1. the receiving state machine receives the system information sent by the peer system through the DRCP message and saves the system information as its own Partner information;

2. it is to judge and process the Operational Key (Actor_OperKey) value of the present system and the operational Key (Partner_OperKey) value of the system which sends the DRCP message in the negotiating state machine. If the Actor_OperKey and the Partner_ OperKey are inconsistent, it is needed to judge whether to modify the Actor_OperKey of the present system according to the policy, and then to trigger the sending state machine to send the Actor_OperKey and the Partner_OperKey to the peer system. Only by ensuring that the operational Key values of the two systems are consistent can it be further ensured that the two systems can be aggregated into one aggregation group;

3. the synchronizing state machine may need to negotiate a unified conversation distribution way. If required, after receiving the DRCP message, the receiving state machine judges and processes the parameters of the conversation distribution way of the adjacent system carried therein, i.e. the two pieces of information of gateway system selection (Actor_GW & Partner_GW, indicating that a certain conversation traffic should go through which gateway link) and aggregator system selection (Actor_Agg & Partner_Agg, indicating that a certain conversation traffic should go through which aggregation port/aggregator). The last negotiated conversation distribution way is used to decide and configure the conversation distribution way within the system in the synchronizing state machine, and meanwhile ports of the intra-portal link are appropriately configured, and conversations are forwarded according to the configured conversation distribution way.

Hereinafter, in conjunction with embodiments and the accompanying drawings, the distributed relay control protocol control method and process in one portal in the DRNI according to the present document will be described in detail.

Figure 1:
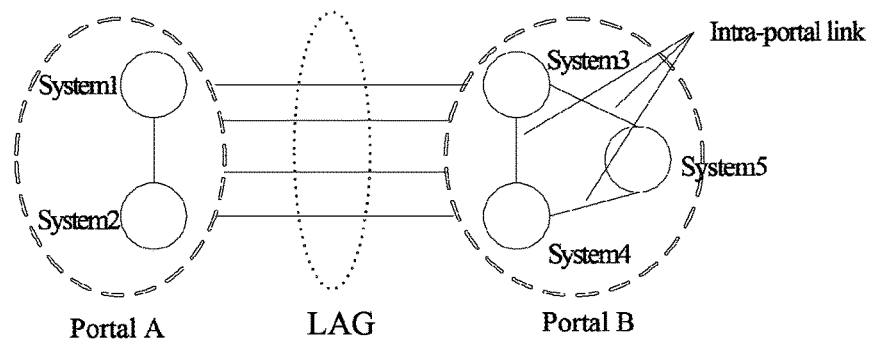
FIG. 1 is a schematic diagram of a network interconnected node connection in the related art.

Herein, the protocol interaction process between the system 1 and the system 2 in the portal A in FIG. 1 is taken as an example for further illustration. Assume that the system 1 considers itself as an Actor and the system 2 as a Partner. Similarly, the system 2 considers itself as the Actor and the system 1 as the Partner. The system 1 receives the Actor information sent by the system 2, and saves the Actor Information as its own Partner information.

Figure 4:
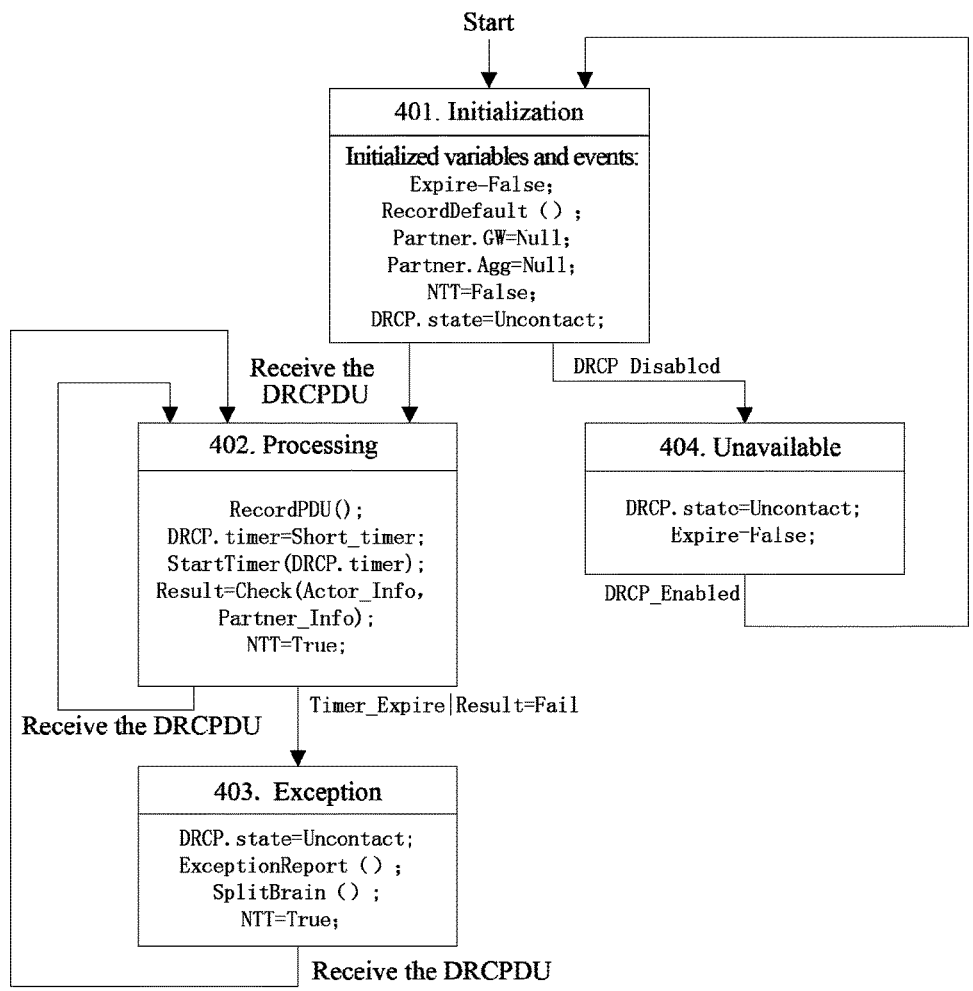
FIG. 4 is a schematic diagram of a processing flow of a receiving state machine in accordance with an embodiment of the present document.

For the receiving state machine in the system 1, its specific process is shown in FIG. 4, comprising:

401. Initialization, it is to initialize some parameter variables.

The timeout ID Expire is set as False, indicating no timeout yet;

It is to record the initial value function RecordDefault ( ) for setting some LACP system parameters of the system 1 as the LACP system parameters of the system 2 considered by the system 1, namely:

Partner_PortalID=Actor_PortalID
Partner_EmulatedSystemID=Actor_EmulatedSystemID
and so on.

It is to set the data distribution parameters of the system 2 considered by the system 1 as null, namely:

Partner_GW=Null
Partner_Agg=Null

It is to set the need-to-transmit ID NTT as False, namely:
NTT=False;

It is to set the state of the distributed relay control protocol DRCP.state as Uncontact, indicating that the two parties have no contact yet, namely:

DRCP.state=Uncontact;

402. When receiving the distributed relay control protocol message (DRCP) DU (Digital Unit) sent by the system 2, the receiving state machine enters the processing state.

It is to record the received protocol message RecordPDU ( ), record the Actor information in the DRCPDU sent by the system 2 as Partner information of the system 1.

It is to set the timer for the DRCP DU expiration detection, namely:

DRCP.timer=Short_timer

It is to start the timer to time for the DRCP DU sent by the system 2 and received at the next time, namely:

StartTimer (DRCP.timer)

It is to perform a matching check (Actor, Partner) on the received information. If the DRCP DU sent by the system 2 is received again before the timer expires, then it is to re-enter the processing state, restart the timer, re-clock and repeat the abovementioned steps for processing check.

Figure 5:
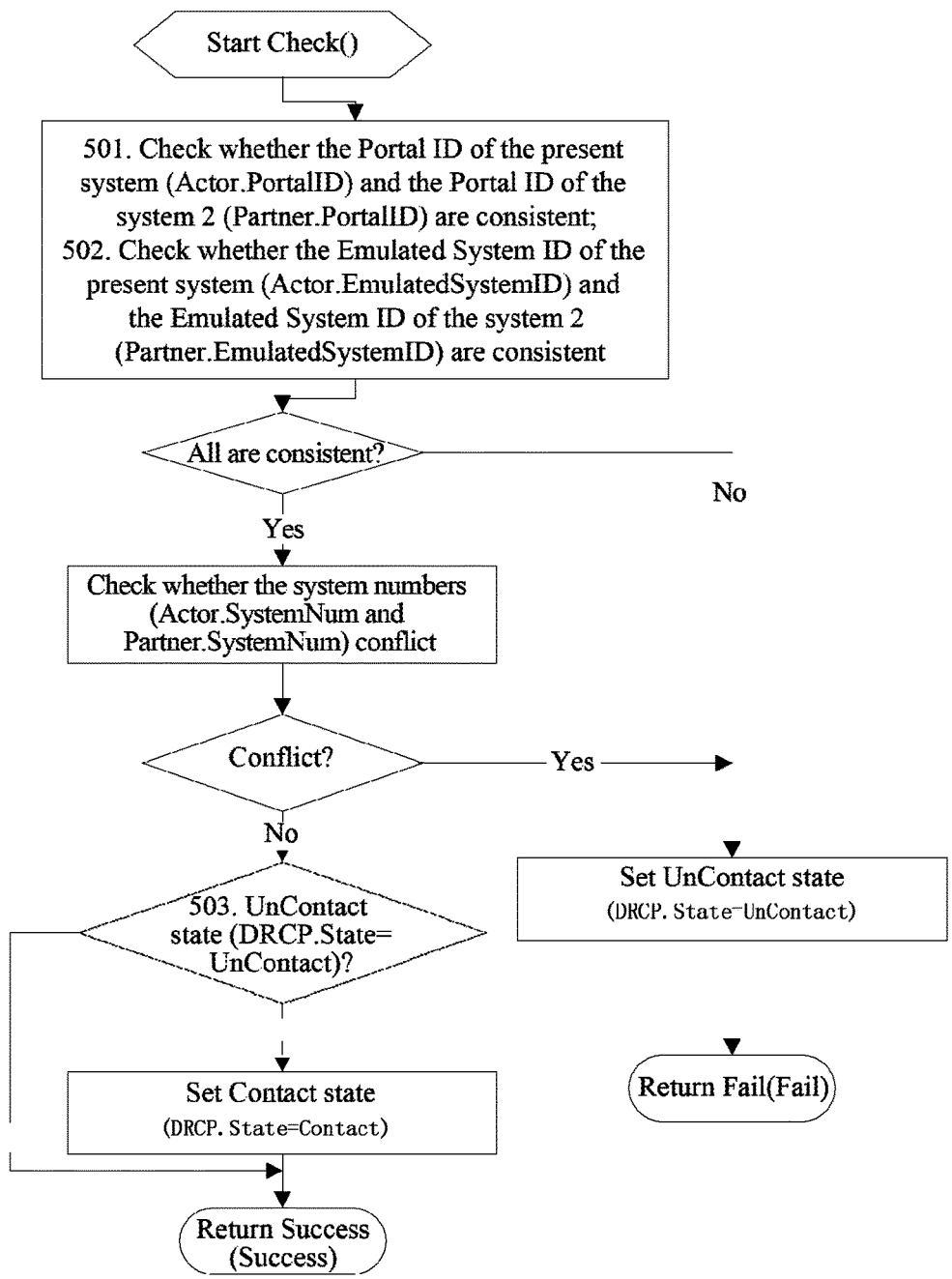
FIG. 5 is a flow diagram of a Check function in accordance with an embodiment of the present document.

The Check (Actor, Partner) mainly functions to perform the matching check on multiple parameters, as shown in FIG. 5, comprising:

After entering the Check function, it is to check the parameters for identifying the system 1 and the system 2, judge whether the system 1 and the system 2 can be aggregated into one logical system, and whether the aggregation groups thereon can be aggregated into a DRNI. It is mainly to comprise:

501) It is to check whether the PortalID of the present system and the PortalID of the system 2 are consistent, and whether the EmulatedSystemID of the present system and the EmulatedSystemID of the system 2 are consistent. If they are consistent, it is indicated that the system 1 and the system 2 may be aggregated into one logical system, and the System ID of the logic system is the unified Emulated System ID of the two systems.

502) If the two parameters of the system 1 and the system 2 are consistent after the comparison in step 1), it is to continue to compare whether the System Number parameters of the system 1 and the system 2 conflict. Generally, each of the multiple systems (typically fewer than or equal to 3 systems) in one portal in the DRNI would have a number, and this number is System Number. For example, the System Number of the system 1=01, the System Number of the system 2=02. This is usually configured for systems, for distinguishing different systems in one portal. Therefore, it is needed to determine that the System Numbers of the two systems are different.

503) If the PortalID of the present system and the PortalID of the system 2, and the EmulatedSystemID of the present system and the EmulatedSystemID of the system 2 are consistent, respectively, and their System Numbers do not conflict, it is indicated that the two systems contact with each other and meet the precondition for aggregating into one logical system, and therefore, if the DRCP.State is not in the Contact state at this time, the DRCP state is set as the Contact state, i.e. DRCP.State=Contact, and the function returns Success, it is indicated that the matching check is passed; if it is not in the UnContact state at this time, i.e. DRCP.State=Contact or DRCP.State=Synchronization, then it is to directly return Success, it is indicated that the matching check is passed, but there is no need for other treatments.

Conversely, if any one of the above checks is not passed, it is indicated that the two systems do not meet the conditions for aggregating into one logical system, and therefore, no matter what state the distributed relay control protocol is in at this time, it is to return its state back to Uncontact, i.e. set:

DRCP.State=Uncontact and the function returns Fail, indicating that the matching check fails.

403. If the DRCP DU sent by the system 2 is still not received again when the timer expires, or the matching check is not passed in the Check function, the system 1 will consider that a Split Brain error occurs, and enters the exception state. In the exception state, the two systems cannot be aggregated into one logical node, and it is needed to reset the distributed relay control protocol state as Uncontact, namely:

DRCP.State=Uncontact and it is to make an exception error alarm, namely:

ExceptionReport ( )

It is to take corresponding actions to deal with, and de-aggregate the two systems, namely:

SplitBrain ( )

Wherein, the work mainly implemented by the SplitBrain ( ) involves:

based on the policy, it may be selected to modify the LACP parameter of the present system, for example, the system 1 can modify its own Operational Key back to the Administration Key set before the negotiation, or modify its own System ID back to the initial System ID of the system rather than the Emulated System ID. In a concrete implementation, the abovementioned policy can be that the system 1 and the system 2 modify respectively, or the system 1 keeps unchanged and the system 2 modifies, or vice versa, thus ensuring that the system 1 and the system 2 are different, at least not identical, in the LACP system parameter.

After the abovementioned operation is executed, from the portal B, the system 1 and the system 2 are no longer aggregated into one logical system.

404. If the distributed relay control protocol is found to be disabled DRCP_Disabled after the initialization, then it is to enter the unavailable state. It is to set the distributed relay control protocol state as Uncontact, namely:

DRCP.State=Uncontact

Figure 6:
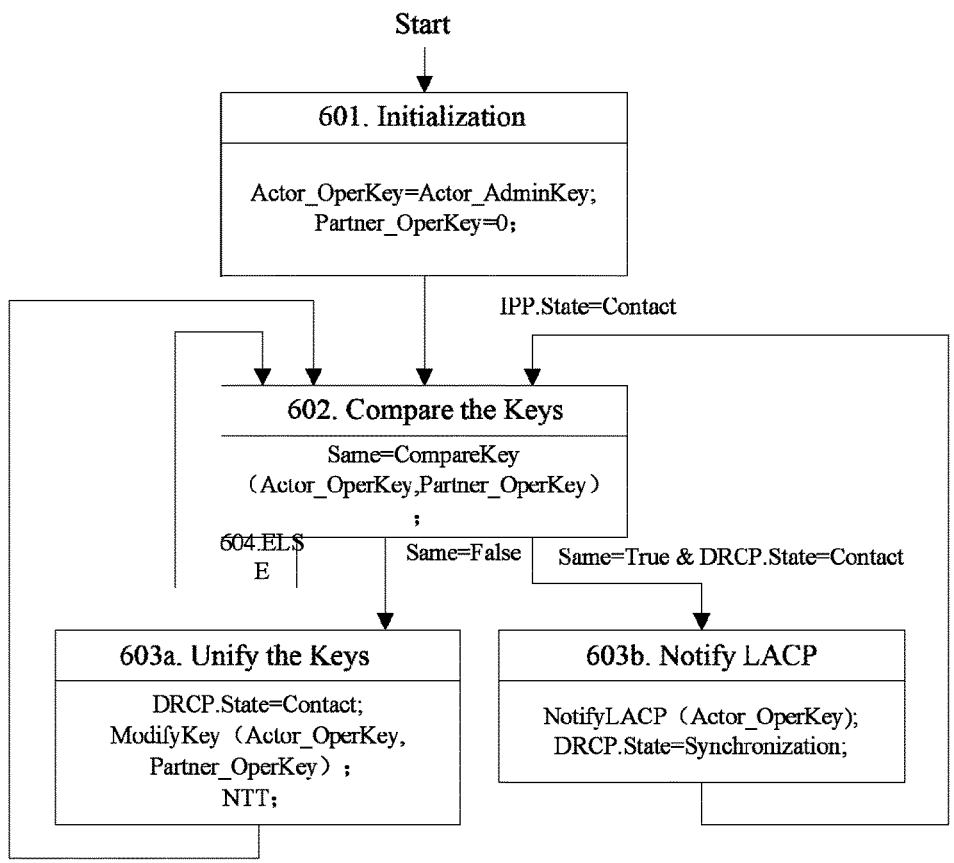
FIG. 6 is a schematic diagram of a processing flow of a negotiating state machine in accordance with an embodiment of the present document.

Once the state of the distributed relay control protocol is set as Contact, the negotiating state machine will be triggered to process the Operational Key of the present system. The specific process is shown in FIG. 6, comprising:

601) It is to compare the LACP parameter Operational Keys of the present system (System 1, i.e. Actor) and the adjacent system (system 2, i.e. Partner).

Same=CompareKey (Actor.OperKey, Partner.OperKey)

Herein, it must be guaranteed that the Operational Key values of the system 1 and the system 2 are consistent to ensure that the system 1 and the system 2 interact with the other portal B in the DRNI through the LACP protocol, the portal B may be aggregated with the aggregation links connected with the portal A into a distributed aggregation group, forming the DRNI.

602) Initially, the Operational Key values of the system 1 and the system 2 may be different, they are equivalent to the Administration Keys of the two systems, respectively, and therefore, if the Operational Key values of the system 1 and the system 2 are different after the comparison, it is to modify in accordance with the relevant policy, for example, in accordance with the parameter of System Priority, if the System Priority of the system 2 takes precedence over the System Priority of the system 1, the system 1 will modify its own Operational Key to the Operational Key of the system 2; when the policy is to modify according to the administration Key value, the system 1 can calculate the corresponding Operational Key based on the administration Key of the present system and the received administration Key value of the system 2 according to a certain algorithm, and take its value as the Operational Key of the present system; wherein the algorithm can be set according to specific conditions, as long as the algorithms selected by the interacted two parties (the system 1 and the system 2 in this case) are the same.

The Operational Key modification function is achieved by ModifyKey ( ), namely:

ModifyKey (Actor.OperKey, Partner.OperKey).

If the DRCP is still in the synchronization state at this time, i.e. DRCP.State=Synchronization, it is needed to return its state back to Contact, namely set DRCP.State=Contact, and to re-determine the Operational Key.

If the present system modifies its own Operational Key to achieve unity, it is needed to send the NTT, to trigger the sending state machine to send the modified Operational Key to the system 2, so as to notify the system 2.

603) Once the Operational Key of the system 2 received by the system 1 is consistent with the Operational Key of the system 1, and at this time the DRCP state is Contact, namely Same=True & DRCP.State=Contact then:

a) it is to start the LACP to send the LACP message to the other portal B in the DRNI, and the parameters carried in the LACP message are the parameters negotiated and determined according to the DRCP, comprising:

Actor.EmulatedSystemID
Actor.OperKey
and so on;

b) it is to set the distributed relay control protocol state as Synchronization, namely DRCP.State=Synchronization;

604) ELSE, it is to repeatedly compare the Operational Keys, to avoid errors, so as to avoid the system 1 from not perceiving that the Operational Key of the system 2 changes. Once the Operational Key value changes, the two systems cannot aggregate.

Figure 7:
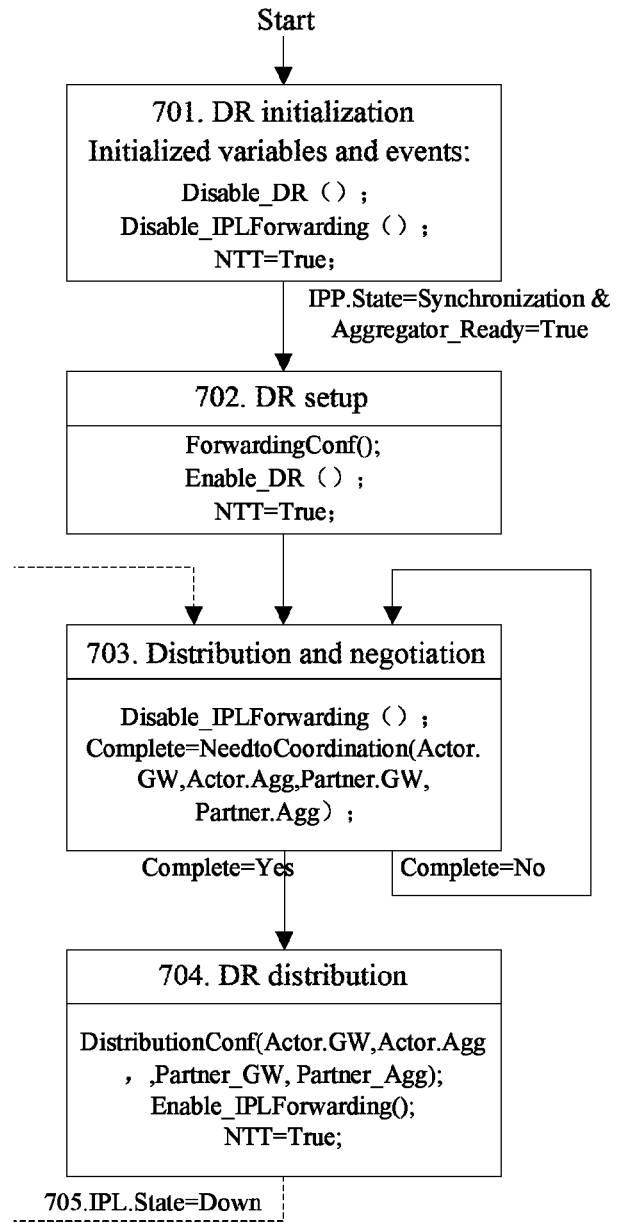
FIG. 7 is a schematic diagram of a processing flow of a synchronizing state machine in accordance with an embodiment of the present document.

The processing procedure of the synchronizing state machine in the system 1 is shown in FIG. 7, comprising:

701. Initialization of DR. Before the system 1 and the system 2 build contacts and negotiate the LACP parameters, the traffic cannot make data forwarding via the DRNI interface. At this time, the DR for setting up the forwarding and aggregation group interfaces in the system 1 has not been set up yet, namely:

Disable_DR ( )

It is to disable the data flow forwarding function of the intra-portal link, namely:

Disable_IPLForwarding ( );

and, it is to trigger NTT=True to notify the system 2 that the DR of the present system has not been set up yet.

702. DR setup. When the distributed relay control protocol state DRCP.State in the contact state is set as Synchronization, i.e. the synchronizing state machine detects DRCP.State=Synchronization and the system 1 has aggregated with the portal B via the LACP through the LACP interaction, and its aggregator has been set up, i.e. Aggregator_Setup=Up, then it is to enter the DR setup state. In this state, there will be:

first it is to configure the gateway (GW) and the aggregator in the present system, and the configuration principle herein is to forward the messages received by the present system in the present system, that is, the data will not be distributed via the intra-portal link, and the specific determining method is related to the concrete implementation of the device:

ForwardingConf ( )

It is to enable the DR, namely:

Enable_DR ( )

So far, the DR can already be used for forwarding data. The DRNI already can work normally.

This function will set up the connection between the forwarding and aggregation group interfaces, thus ensuring that the DRNI interface can receive and send data messages.

After the DR of the system 1 has been set up, the NTT can be triggered to notify the system 2.

Thus, a distributed link aggregation group has been set up, and the data traffic can already be normally forwarded in the DRNI.

703. Distribution and negotiation. Sometimes in order to improve the controllability of the system on the traffic distribution, so that the DRNI technology can better meet the load balancing and protection needs, the DRCP control protocol may also need to further strengthen the data traffic distribution function, that is, the traffic can be forwarded between the system 1 and the system 2, which requires transmitting data messages via the IPL, but this requires that the system 1 and the system 2 reach an agreement on the selection of the gateway and the aggregator of data flow; otherwise, disorder, and even serious problems such as a ring network storm, will occur.

Therefore, before the negotiation reaches an agreement, it is needed to disable the data flow forwarding function of the IPL to avoid wrong forwarding of traffic:

Disable_IPLForwarding ( )

Then the system 1 starts to negotiate with the system 2 for the traffic distribution in the DR:

Complete=NeedtoCoordination (Actor.GW, Actor.Agg, Partner.GW, Partner.Agg)

The specific process of the function can refer to the related depiction below and will not be repeated here.

When Complete=Yes, it is to enter the DR distribution, the data traffic will be distributed according to the new distribution algorithm; if the negotiation fails, i.e. Complete=No, then it is to repeat the distribution and negotiation process.

704. DR distribution. When an agreement is reached after the negotiation, i.e. Complete=Yes, the DR needs to enable the data flow forwarding function of the intra-portal link connecting the system 1 and the system 2, enable the forwarding function of the upper portal on the intra-portal link, and configure the traffic distribution ways of the system 1 and the system 2 as well as the corresponding related variables, comprising:

a) First, it is to perform related configuration on DR traffic distribution according to the previous negotiation result.

DistributionConf (Actor.GW, Actor_Info.Agg, Partner.GW, Partner.Agg)

Herein, the data traffic is distributed based on the conversation ID of the traffic.

Herein, the traffic conversation distribution way of the system 1 is taken for example, according to information of the Actor_Agg and the Partner_Agg, as well as the Actor_GW and the Partner_GW, the distribution way of the DR in the system 1 is modified as shown in Table 1 below:

TABLE 1

| The distribution way of the DR in the system 1 | | |
|---|---|---|
| Gateway (GW) | Aggregator (Agg) | Port to which the conversation sends |
| System 1 | Any | The system 1 forwards to other portals |
| System 2 | System 1 | Aggregation portal of the system 1 |
| | System 2 | Discard |

For the traffic conversation ID=100, its current gateway selection is the system 1, and the aggregator selection is the system 2, and therefore, the intra-portal link portal in the system 1 needs to be configured as Pass (i.e. IPL.Conversation[100]=Pass) for the traffic with the conversation ID=100; the intra-portal link portal in the system 2 should also be configured as Pass (IPL.Conversation[100]=Pass) for the traffic with the conversation ID=100.

For the traffic conversion ID=200, its current gateway selection is the system 1, and the aggregator selection is also the system 1, and therefore, the conversation traffic does not need to be forwarded via the intra-portal link, its intra-portal link portal needs to be configured as not pass (ie IPL.Converstation=Discard) for the traffic with the conversation ID=200.

b) After the configuration is completed, the data flow forwarding function of the IPL is enabled, namely:

Enable_IPLForwarding( )

Since then, the data traffic can be forwarded between the system 1 and the system 2 based on the configuration.

In the above work, only when the link interconnected between the system 1 and the system 2 plays the role of intra-portal link and can be used for forwarding data, i.e. IPL.State=Up, can the distributed relay control protocol be in the forwarding state, and the DR distribute the traffic in accordance with the distribution way negotiated by the system 1 and the system 2.

705. Once the link fails, or is occupied by other mechanisms for other purposes, and does not work as the intra-portal link for forwarding the data traffic, i.e. IPL.State=Down, the data traffic can no longer be forwarded between the system 1 and the system 2, then there are two options:

a) it is to re-adjust the distribution of traffic according to the negotiated distribution algorithm, wherein the traffic of each conversation is no longer forwarded via the intra-portal link;

b) it is to return back to the distribution and negotiation sub-state, disable the data traffic forwarding function of the IPL, the DRs in the system 1 and the system 2 return back to their own states before the negotiation to forward the data traffic.

Specifically selecting which method needs to be decided according to the content of the DR distribution algorithm negotiated between the system 1 and the system 2. If their negotiated DR distribution algorithm comprises not only the conversation traffic distribution information when IPL.State=Up but also the conversation traffic distribution information when IPL.State=Down, then method a) is adopted; if it only comprises the conversation traffic distribution information when IPL.State=Up, then method b) is adopted, returning back to the distribution and negotiation sub-state, and forwarding the data traffic according to the method before the negotiation.

Figure 8:
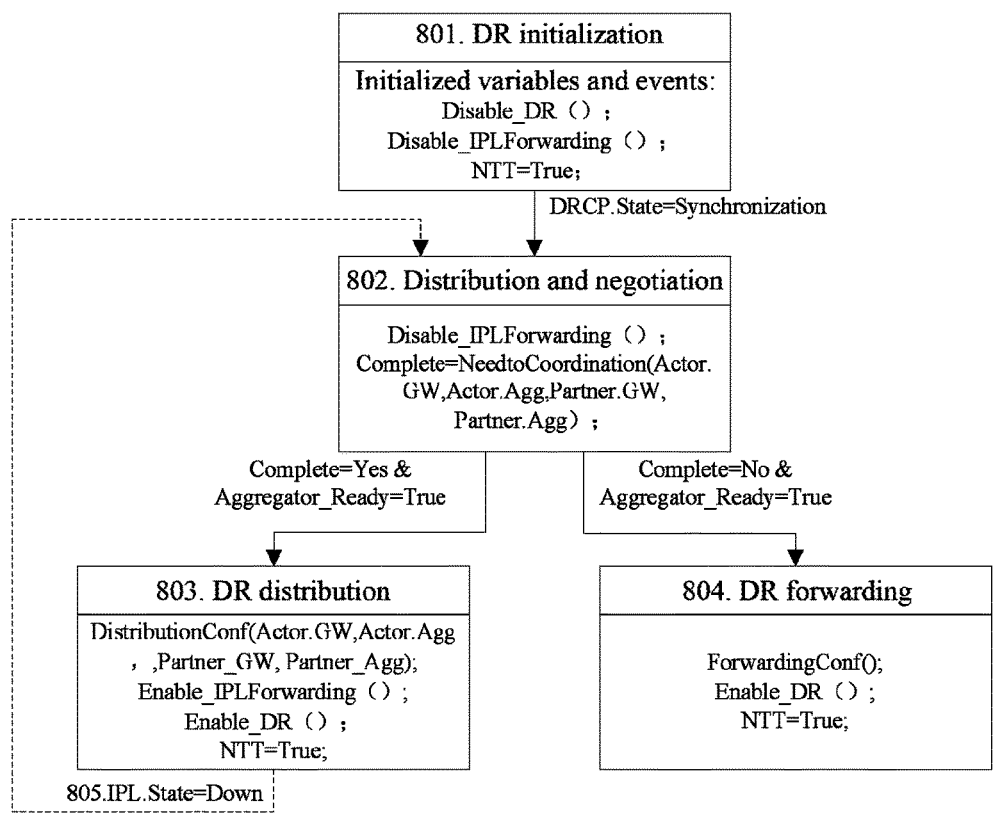
FIG. 8 is a schematic diagram of another processing flow of the synchronizing state machine in accordance with an embodiment of the present document.

In another embodiment, the synchronizing state machine in the system 1 can also process according to the following procedure, as shown in FIG. 8:

801. Initialization of DR. Before the system 1 and the system 2 build contacts and negotiate the LACP parameter, the traffic cannot make data forwarding through the DRNI interface. Then the DR for setting up the forwarding and aggregation group interfaces in the system 1 has not been set up yet, namely:

Disable_DR ( )

It is to disable the data traffic forwarding function of the intra-portal link, namely:

Disable_IPLForwarding ( );

And, it is to trigger NTT=True to notify the system 2 that the DR of the present system has not been set up yet.

802. Distribution and negotiation. When the distributed relay control protocol state DRCP.State in the contact state is set as Synchronization, i.e. when the synchronizing state machine detects DRCP.State=Synchronization, first it is to perform negotiation of the conversation distribution algorithm.

First, it is to disable the data forwarding function of the IPL, that is, data cannot be distributed between the system 1 and the system 2 through the IPL:

Disable_IPLForwarding ( )

and then it is to start the negotiation of the conversation distribution algorithm between the system 1 and the system 2:

Complete=NeedtoCoordination (Actor.GW, Actor.Agg, Partner.GW, Partner.Agg)

The specific procedure of this function can refer to the related depiction below, which will not be repeated here.

When Complete=Yes, and the aggregator has been set up completely, i.e. Aggregator_Ready=True, it is to enter the DR distribution sub-state, and the data traffic will be distributed according to a new distribution algorithm.

If the negotiation is not completed for some reasons, i.e. Complete=No, and the aggregator has also been set up, i.e. Aggregator_Ready=True, then it is to enter the DR forwarding sub-state, the data traffic will be forwarded according to the gateway selection and the aggregation selection decided by the respective DRs of the system 1 and the system 2, the configuration principle herein is that the messages received by the present system are forwarded in the present system, that is, the data will not be distributed via the intra-portal link, and the specific determination method is related to the concrete implementation of the device.

803. In the DR forwarding sub-state, first the respective DRs of the system 1 and the system 2 decide the gateway selection and the aggregator selection, the configuration principle herein is that the messages received by the present system are forwarded in the present system, namely ForwardingConf ( )

It is to enable the DR, namely:

Enable_DR ( )

So far, the DR already can be used for forwarding data. The DRNI already can work normally.

804. In the DR distribution sub-state, it is to perform the related configuration on the DR traffic distribution in accordance with the previous negotiation result, namely:

DistributionConf (Actor.GW, Actor_Info.Agg, Partner.GW, Partner.Agg)

Herein the data traffic is distributed based on the conversation ID of the traffic.

Herein the traffic conversation distribution way of the system 1 is taken for example, according to the information of the Actor_Agg and the Partner_Agg, as well as the Actor_GW and the Partner_GW, the DR distribution way in the system 1 is modified as shown in Table 1.

For the traffic conversation ID=100, its current gateway selection is the system 1, and its aggregator selection is the system 2, and therefore, the intra-portal link portal of the system 1 needs to be configured as Pass (i.e. IPL.Conversation[100]=Pass) for the traffic with the conversation ID=100; the intra-portal link portal of the system 2 also needs to be configured as Pass (IPL.Conversation[100]=Pass) for the traffic with the conversation ID=100.

For the traffic conversation ID=200, its current gateway selection is the system 1, and its aggregator selection is also the system 1, and therefore the conversation traffic does not need to be forwarded through the intra-portal link, its intra-portal link port needs to be configured as not pass (i.e. IPL.Converstation[200]=Discard) for the traffic with the conversation ID=200.

b) After the configuration is completed, it is to enable the data traffic forwarding function of the IPL, namely:

Enable_IPLForwarding ( )

Since then, the data traffic can perform the data traffic forwarding between the system 1 and the system 2 based on the configuration.

c) And, it is to enable the DR, namely:

Enable_DR ( )

Thereby the DR can distribute the traffic formally in accordance with the distribution configuration method after the negotiation.

For the work of the DR distribution sub-state, only when the link interconnected between the system 1 and the system 2 plays the role of intra-portal link and can be used for forwarding data, i.e. IPL.State=Up, can the distributed relay control protocol be in the forwarding state, and can the DR distribute the traffic in accordance with the distribution way negotiated by the system 1 and the system 2.

805. Once the link fails or is occupied by other mechanisms for other purposes, it will not work as the intra-portal link for forwarding data traffic, i.e. IPL.State=Down, there is no data traffic forwarded between the system 1 and the system 2, then there are two options:

a) it is to re-adjust the distribution of traffic according to the negotiated distribution algorithm, the traffic of each conversation is no longer forwarded via the Intra-portal link;

b) it is to return back to the distribution and negotiation sub-state, and disable the data traffic forwarding function of the IPL, the DRs in the system 1 and the system 2 return back to the DR forwarding sub-state to forward the traffic because IDL.State=Down and the negotiation is not successful.

Figure 9:
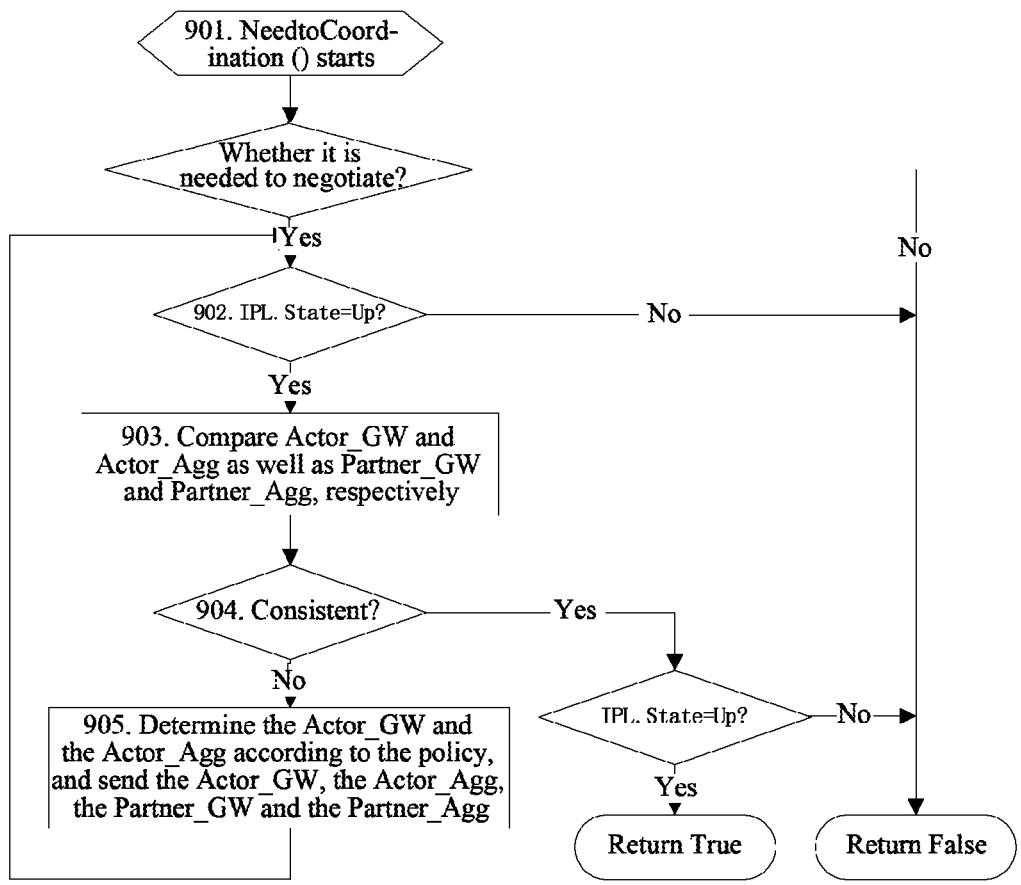
FIG. 9 is a flow diagram of Need to Coordination function in accordance with an embodiment of the present document.

The NeedtoCoordination ( ) function is used for unifying the traffic distribution of the system 1 and the system 2. Generally, the DRNI has data traffic in two directions, one is data traffic sent from other network ports to the aggregation port and the other is data traffic received by the aggregation port and sent to other network ports. The traffic in the first direction needs to select whether to send from the aggregator of the system 1 or the aggregator of the system 2 to the aggregation interface in the DR, and at this time, the traffic distribution is determined by the Actor_Info.Agg; the traffic in the second direction needs to select whether to send from the system 1 to other network ports or to send to the system 2 via the Intra-portal link and then to other network ports in the DR, and at this time, the traffic distribution is determined by the Actor_Info.GW. Therefore, the NeedtoCoordination ( ) function is used for unifying the Actor_Info.Agg and the Partner_Info.Agg, as well as the Actor_Info.GW and the Partner_Info.GW, to prevent conflicts. The specific process is as shown in FIG. 9, comprising:

901. it is to judge whether it is needed to perform the interaction of gateway selection and aggregator selection between the present system and the adjacent system, if it is not needed, then it is to directly return No interaction, and set Complete=False; if it is needed, then further judgment is needed;

902. it is to judge whether the IPL can play the role of intra-portal link and be used to forward data, i.e. whether the IPL.State is Up, if the IPL state is still Down at this time, that is, it cannot be used for forwarding data traffic between the system 1 and the system 2, and therefore it is to return to No interaction, Complete=False; if IPL.State=Up, then it is to proceed to the next step;

903. it is to start to compare the information of the gateway selection and the aggregator selection of the present system with the information of the gateway selection and the aggregator selection of the system 2;

904. it is to judge whether the two systems are consistent in terms of the conversation traffic distribution, that is, whether the system 1 and the system 2 have the same decisions on traffic distribution. If they are consistent, it is indicated that the interaction is completed, i.e. Complete=True;

905. if they are not consistent, then it is to perform the following treatments:

a) it is to determine information of the Acto.GW and the Actor.Agg in accordance with the established policy;

b) it is to let the sending state machine send information of the Actor.GW, the Actor.Agg, the Partner.Agg and the Partner.GW to the system 2 by triggering the NTT.

After the treatments, it is to return back to the start and perform the judgment and comparison again, until the function returns True or False.

Herein the established policy includes but is not limited to the following two kinds:

a) the system 1 fully accepts the information of the gateway selection and the aggregator selection of the system 2, that is, after the interaction and modification, the system 1 and the system 2 are exactly consistent in terms of the gateway selection and the aggregator selection;

b) the system 1 and the system 2 only select the part in which they are consistent, and only distribute the consistent conversation traffic, and discard the conversation traffic that conflicts in gateway selection and aggregator selection. Or they report and alarm the conflicting conversation traffic, and the high-layer protocol or network administrator makes the appropriate adjustment. Once the originally conflicting conversation traffic reaches an agreement after the adjustment, the distribution of the conversation traffic can be restored again.

Those ordinarily skilled in the art can understand that all or some of steps of the abovementioned method may be completed by programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above depiction is only the preferred embodiments of the present document and is not used to limit the protection scope of the present document. According to the inventive content of the present document, there may be many other embodiments, and without departing from the spirit and essence of the present document, those skilled in the art can make appropriate changes and modifications in accordance with the present document, and all changes, equivalents and improvements made within the spirit and principle of the present document should be included within the protection scope of the present document.

INDUSTRIAL APPLICABILITY

The embodiments of the present document achieve the control communication between multiple systems in one portal in the distributed link aggregation group, and can effectively achieve protection on the interconnected interface, not only protection on the link but also protection on the level of node, after multiple systems aggregate into one aggregation group.

What is claimed is:

1. A method for information interaction between systems in a same portal in a distributed resilient network interconnection, used in each system in a portal of a link aggregation group, comprising:

sending a distributed relay control protocol (DRCP) message via an intra-portal interface, wherein at least system information of a present system is carried;

after receiving a DRCP message sent by an adjacent system, if it is judged that the present system and the adjacent system can form an portal of the distributed resilient network interconnection, determining an operational Key value of the present system;

the method further comprising: after determining the operational Key value of the present system, setting up a distributed relay channel within the present system;

the method further comprising: before negotiating a unified conversation distribution way with the adjacent system, disabling a data traffic forwarding function of an intra-portal link with the adjacent system; and after negotiating the unified conversation distribution way with the adjacent system and unifying a distribution algorithm, enabling the data traffic forwarding function of the intra-portal link.

2. The method of claim 1, further comprising:

after determining the operational Key value of the present system, negotiating a unified conversation distribution way with the adjacent system, or, wherein, said setting up a distributed relay channel within the present system comprises:

configuring the conversation distribution of the distributed relay on a gateway and an aggregator/aggregation port, and after the configuration, the distributed relay forwarding conversation traffic between the gateway and the aggregator/aggregation port in the present system.

3. The method of claim 2, wherein, said negotiating a unified conversation distribution way with the adjacent system comprises:

negotiating the conversation distribution way carried in the DRCP message sent by the adjacent system and the conversation distribution way of the present system, and configuring a traffic distribution way of a distributed relay within the present system in accordance with the negotiated conversation distribution way;

the conversation distribution way comprises any one or combination of the following two parameters: a gateway system selection and an aggregator/aggregation port selection.

4. The method of claim 3, wherein, said negotiating the conversation distribution way carried in the DRCP message sent by the adjacent system and the conversation distribution way of the present system comprises:

comparing the conversation distribution way carried in the DRCP message sent by the adjacent system with the conversation distribution way of the present system, and for conversations that are consistent in the conversation distribution way, the distributed relay distributing traffic of the conversations according to the consistent conversation distribution way, for conversations that have conflicts in the conversation distribution way, the distributed relay filtering or discarding traffic of the conversations that have conflicts in the conversation distribution way, or, wherein, when the intra-portal link with the adjacent system fails or the intra-portal link is unavailable, the distributed relay is restored to the configuration of the conversation distribution way before the negotiation.

5. The method of claim 1, wherein, said judging that the present system and the adjacent system can form the same portal comprises:

performing a matching check on the system information of the adjacent system carried in the received DRCP message and the system information of the present system, if the matching check is passed, determining that the present system and the adjacent system can form the same portal.

6. The method of claim 5, wherein, said performing a matching check on the system information of the adjacent system carried in the received DRCP message and the system information of the present system comprises:

judging whether a Portal ID of the present system and a Portal ID of the adjacent system are consistent; and/or judging whether an Emulated System ID of the present system and a Emulated System ID of the adjacent system are consistent;

the matching check being passed comprises:
the Portal ID of the present system and the Portal ID of the adjacent system being the same, and/or the Emulated System ID of the present system and the Emulated System ID of the adjacent system being the same, wherein, said performing a matching check on the system information of the adjacent system carried in the received DRCP message and the system information of the present system further comprises:
judging whether a System Number of the present system conflicts with a System Number of the adjacent system;
the matching check being passed comprises:
the Portal ID and/or Emulated System ID of the present system and the Portal ID and/or Emulated System ID of the adjacent system being the same respectively, and the System Number of the present system not conflicting with the System Number of the adjacent system,
or,
the method further comprises:
if the matching check is passed, saving the system information of the adjacent system carried in the DRCP message.

7. The method of claim 1, wherein,
said sending a DRCP message comprises: periodically sending the DRCP message;
the method further comprises:
after receiving the DRCP message sent by the adjacent system each time, starting a timer;
if the DRCP message sent by the adjacent system is not received when the timer expires, or if the DRCP message sent by the adjacent system is received before the timer expires but the matching check is not passed, determining that the present system and the adjacent system no longer can form a portal of the distributed resilient network interconnection.

8. The method of claim 7, further comprising:
if it is determined that the present system and the adjacent system no longer can form a portal of the distributed resilient network interconnection, determining whether it is needed to modify the system information of the present system based on the policy; if it is needed to modify, modifying at least part of LACP parameters in the system information of the present system, and sending the modified LACP parameter(s) to the peer portal of the distributed resilient network interconnection through an LACP message; wherein the modified LACP parameter(s) of the present system is/are at least not identical with the LACP parameters of the adjacent system,
wherein,
said modifying at least part of LACP parameters in the system information of the present system comprises:
modifying the operational key value and/or the System ID of the present system, or restoring the operational Key value to the administration Key value.

9. The method of claim 1, wherein,
said sending a DRCP message comprises:
when there is a parameter updated in the system information of the present system, sending the DRCP message.

10. The method of claim 1, wherein,
said determining an operational Key value of the present system comprises:
if it is judged that the operational Key value of the present system and the operational Key value of the adjacent system are the same, remaining the operational Key value of the present system unchanged, and
if it is judged that the operational Key value of the present system and the operational Key value of the adjacent system are different, based on a policy, modifying the operational Key value of the present system or remaining the operational Key value of the present system unchanged,
or,
wherein,
said determining an operational Key value of the present system comprises:
calculating the operational Key value of the present system in accordance with an administration Key value of the present system and a received administration Key value of the adjacent system.

11. The method of claim 1, further comprising:
after determining the operational Key value of the present system, sending the operational Key value of the present system to a peer portal of the distributed resilient network interconnection through a Link Aggregation Control Protocol (LACP) message.

12. The method of claim 1, wherein,
the DRCP message sent via the intra-portal interface also carries the system information and/or conversation distribution ways of other adjacent systems connected with the present system.

13. A system for implementing distributed relay control in a distributed resilient network interconnection, comprising:
a sending state machine, configured to: when other state machines in the present system instruct Need to transmit or Need to transmit periodically, send a distributed relay control protocol (DRCP) message;
a receiving state machine, configured to: receive a DRCP message sent by an adjacent system, perform a matching check on system information of the present system and the adjacent system, record information in the DRCP message after the matching check is passed, and start a timer to judge whether the DRCP message sent by the adjacent system again is received on time;
a negotiating state machine, configured to: determine an operational Key value of the present system, and ensure that the operational Key value is consistent with an operational Key value of the adjacent system;
a synchronizing state machine, configured to: establish a forwarding channel between an aggregator/aggregation port and a gateway, negotiate a unified conversation distribution way with the adjacent system as required, and configure the conversation distribution way of a distributed relay;
a periodic sending state machine, configured to: decide to periodically send the DRCP message by the sending state machine.

14. The system of claim 13, wherein,
the receiving state machine being configured to perform the matching check on the system information of the present system and the adjacent system, comprises:
the receiving state machine judging whether a Portal ID of the present system and a Portal ID of the adjacent system are consistent; and/or judging whether an Emulated System ID of the present system and an Emulated System ID of the adjacent system are consistent;

the matching check being passed comprises:
the Portal ID of the present system and the Portal ID of the adjacent system being the same, and/or the Emulated System ID of the present system and the Emulated System ID of the adjacent system being the same,
wherein,
the receiving state machine being configured to perform the matching check on the system information of the present system and the adjacent system, further comprises:
the receiving state machine judging whether a System Number of the present system conflicts with a System Number of the adjacent system;
the matching check being passed comprises:
the Portal ID and/or the Emulated System ID of the present system and the Portal ID and/or the Emulated System ID of the adjacent system being the same respectively, and the System Number of the adjacent system being legal, or, the System Number of the present system not conflicting with the System Number of the adjacent system.

15. The system of claim 13, wherein,
the negotiating state machine being configured to determine the operational Key value of the present system, and ensure that the operational Key value is consistent with the operational Key value of the adjacent system, comprises:
when judging that the operational Key value of the present system and the operational Key value of the adjacent system are the same, the negotiating state machine remaining the operational Key value of the present system unchanged;
when judging that the operational Key value of the present system and the operational Key value of the adjacent system are different, based on a policy, the negotiating state machine modifying the operational Key value of the present system or remaining the operational Key value of the present system unchanged,
or,
wherein,
the negotiating state machine being configured to determine the operational Key value of the present system, and ensure that the operational Key value is consistent with the operational Key value of the adjacent system, comprises:
according to an administration Key value of the present system and a received administration Key value of the adjacent system, the negotiating state machine calculating the operational Key value of the present system.

16. The system of claim 15, wherein,
the negotiating state machine is further configured to: after determining the operational Key value of the present system, send the operational Key value of the present system to a peer portal of the distributed resilient network interconnection through a Link Aggregation Control Protocol (LACP) message,
or,
wherein,
the receiving state machine being configured to modify the at least part of the LACP parameters in the system information of the present system, comprises:
the receiving state machine modifying the operational Key value and/or the System ID of the present system, or restoring the operational Key value to the administration Key value.

17. The system of claim 13, wherein, the synchronizing state machine being configured to negotiate the unified conversation distribution way with the adjacent system, comprises:
negotiating the conversation distribution way carried in the DRCP message sent by the adjacent system and the conversation distribution way of the present system, and configuring a traffic distribution way of the distributed relay in the present system in accordance with the negotiated conversation distribution way,
wherein,
the synchronizing state machine being configured to negotiate the conversation distribution way carried in the DRCP message sent by the adjacent system and the conversation distribution way of the present system, comprises:
the synchronizing state machine comparing the conversation distribution way carried in the DRCP message sent by the adjacent system with the conversation distribution way of the present system, and for conversations that are consistent in the conversation distribution way, distributing traffic of the conversations according to the consistent conversation distribution way, for conversations that have conflicts in the conversation distribution way, filtering or discarding traffic of the conversations that have conflicts in the conversation distribution way.

18. The system of claim 17, wherein,
the conversation distribution way comprises any one or combination of the following two parameters: a gateway system selection and an aggregator/aggregation port selection,
or,
wherein,
the synchronizing state machine is further configured to: when the intra-portal link with the adjacent system fails or the intra-portal link is unavailable, restore the distributed relay to the configuration of the conversation distribution way before the negotiation.

19. The system of claim 13, wherein,
the synchronizing state machine is further configured to: before negotiating the unified conversation distribution way with the adjacent system, disable a data traffic forwarding function of an intra-portal link with the adjacent system;
after negotiating the unified conversation distribution way with the adjacent system and unifying a distribution algorithm, enable the data traffic forwarding function of the intra-portal link,
or,
wherein,
the receiving state machine is further configured to: if the DRCP message sent by the adjacent system again is not received on time or the received DRCP message sent by the adjacent system again does not pass the matching check, judge whether it is needed to modify the system information of the present system based on the policy; if it is needed to modify, modify at least part of LACP parameters in the system information of the present system, and send the modified LACP parameter(s) to the peer portal of the distributed resilient network interconnection through the LACP message; wherein the modified LACP parameter(s) of the present system is/are at least not identical with the LACP parameters of the adjacent system,
wherein, the receiving state machine being configured to modify the at least part of the LACP parameters in the system information of the present system, comprises: the receiving state machine modifying the operational Key value and/or the System ID of the present system, or restoring the operational Key value to the administration Key value, or, wherein, the DRCP message sent by the sending state machine via the intra-portal interface also carries system information and/or conversation distribution way of other adjacent systems connected with the present system.

* * * * *